United States Patent [19]

Wasitis et al.

[11] Patent Number: 4,810,565
[45] Date of Patent: Mar. 7, 1989

[54] FIRE RETARDANT ELASTOMERIC EPDM ROOF SHEETING AND FLASHING COMPOSITES

[75] Inventors: William A. Wasitis, Indianapolis; James L. Hoff, Brownsburg, both of Ind.

[73] Assignee: The Firestone Tire & Rubber Company, Akron, Ohio

[21] Appl. No.: 79,306

[22] Filed: Jul. 29, 1987

[51] Int. Cl.[4] .................. B32B 27/08; B32B 25/12
[52] U.S. Cl. ...................... 428/215; 428/147;
  428/519; 428/696; 428/697; 428/702; 428/920;
  525/942; 156/333; 156/334; 156/305; 52/309.1
[58] Field of Search ............... 428/920, 215, 519, 696,
  428/697, 702, 147; 525/942

[56] References Cited

U.S. PATENT DOCUMENTS

| | | | |
|---|---|---|---|
| 2,341,360 | 2/1944 | Bulgin | 154/43 |
| 3,493,460 | 2/1970 | Windecker | 161/93 |
| 3,549,474 | 12/1970 | Lonning | 161/151 |
| 3,992,842 | 11/1976 | Haage et al. | 52/309 |
| 4,000,140 | 12/1976 | Tierney | 260/28.5 |
| 4,032,491 | 6/1977 | Schoenke | 260/28.5 |
| 4,172,179 | 10/1979 | Yost | 428/516 |
| 4,515,744 | 5/1985 | Stamper et al. | 264/171 |
| 4,551,392 | 11/1985 | Draexler | 428/495 |

Primary Examiner—P. C. Ives
Attorney, Agent, or Firm—Ernst H. Ruf

[57] ABSTRACT

A fire retardant composite roofing material comprising an upper layer of a fire retardant EPDM material and a lower layer of a non-fire retardant EPDM material, wherein this composite material is a cured sheet membrane, a vulcanizable flashing material, or non-vulcanizing flashing material.

5 Claims, 1 Drawing Sheet

FIRE RETARDANT ELASTOMERIC EPDM ROOF SHEETING AND FLASHING COMPOSITES

TECHNICAL FIELD

The field of art to which this invention pertains is that of fire retardant elastomeric roof sheeting or flashing materials. More particularly, the invention relates to fire retardant elastomeric EPDM roof sheeting or flashing composites which comprise a top layer of a fire retardant EPDM composition and a bottom layer of a standard non-fire retardant EPDM composition.

BACKGROUND OF THE ART

Elastomeric roof sheeting, also referred to as roofing membranes, are known for use as roofing materials, particularly as single ply rubber roofing membranes for industrial and commercial flat roofs. These membranes are generally applied to the roof surface in the vulcanized or cured state. Elastomers which are most commonly employed in forming the membranes are EPDM, butyl and neoprene, but chlorosulfonated polyethylene and chlorinated polyethylene are occasionally utilized in some special applications. The roofing membranes are generally prepared by calendering the unvulcanized elastomer compounds into sheets of various widths, lengths and thickness and then vulcanizing the sheets usually employing hot air or steam autoclave, although continuous vulcanization is reported to be beyond the research phase.

Elastomeric roof flashing is also known for its use on roofs, especially flat roofs. This material is employed to seal around elements that extend or protrude from the roof surface such as sky lights, air conditioning units, vent pipes and the like. The elastomeric flashing compound is often formulated using the same elastomers as are employed in the roof sheeting compound, but a special curing package is included in the compound which allows it to cure over an extended period of time under ambient temperature conditions. Thus, the roof flashing is applied to the roof surface in the unvulcanized state and cures in-situ on the roof.

Vulcanizable elastomeric EPDM and butyl compositions containing conventional carbon blacks, fillers and vulcanizing agents have long been known in the tire and industrial rubber products arts.

More recently, vulcanizable EPDM and/or butyl rubber compositions have been proposed for use as roof sheeting and flashing materials as illustrated by U.S. Pat. Nos. 4,461,875 and 4,514,442. The aforementioned patents relate to roof sheeting and flashing compositions which comprise an elastomer selected from the group consisting of EPDM, butyl rubber and an EPDM-butyl rubber mixture; from 0.1 to 3.0 parts of a compound having the structural formula $[(CH_2)_nNCS]_2S_6$ wherein n is 4 or 5; and 0 to 5.0 parts of a sulfur donor curative. The patents further disclose that the compositions may additionally contain one or more vulcanizing accelerators, processing oils, plasticizers, fillers and reinforcing agents. Among the fillers and reinforcing agents which are said to be especially useful are carbon black, silicates, talc, calcium carbonate and the like.

Single-ply EPDM membranes of the type previously described are generally singular formula, homogeneous, membrane types that may contain fire retardant chemical formulations (sometimes referred to as fire retardant membranes) or they may not contain such chemicals and are known as standard EPDM membranes. In either case, the entire membrane thickness is of the same material composition. Both types of membranes are in commercial use.

The standard (non-fire retardant) prior art membranes of singular homogeneous materials have relied on subsequently applied coatings of a fire retardant nature to enable standard EPDM membranes to pass all Class A and B ASTM E 108 (UL-790) testing. These coatings degrade in time and if not replaced, result in loss of fire retardancy. The composite of this invention is a unitary, singular product that will perform equal to the noted coated product, but will neither degrade nor require replenishment to maintain its fire retardancy.

The composite of this invention, relative to a single ply 100% fire retardant membrane now in commercial use, has the following advantages:

(1) Cost;
(2) Greater tensile strength;
(3) Enhanced aging properties;
(4) Increased adhesion when the two plies are calendered into a single sheet;
(5) Equivalent fire retardancy in some roofing assemblies; and
(6) Improved factory seam strength.

Thus, the prior art has not successfully produced the fire retardant composite roofing material of the present invention, as evidenced by the following prior art patents:

Draexler, U.S. Pat. No. 4,551,392, discloses a composite material layer which comprises two distinct layers, a first layer in the form of an EPDM or EPM elastomeric composition, and a second layer of a different elastomeric component. The second layer can have, e.g., a flame retardant property (col. 1, line 14).

Bulgin, U.S. Pat. No. 2,341,360, discloses a fire resistant electrically conductive rubber article which is used in the flooring of hospital rooms and which was designed to prevent the accumulation of static charges of electricity as well as ignition of the floor. As a result, a two-layer composite having a flame retardant lower rubber layer 10 and a rubber mix in the form of an upper layer 11 rendered conductive by being compounded with conductive materials is shown. A layer of fire resistant electrically conductive rubber layer is calendered into sheets and is applied in an unvulcanized state to a calendered sheet formed of rubber and several incombustible substances.

Lonning, U.S. Pat. No. 3,549,474, discloses a fire retardant insulation material which can comprise a low density batt and an organic facing layer. This insulation comprises a facing layer 11 and a batt 13 attached to each other by an intermediate layer of adhesive 12. Each facing layer is said to have excellent fire retardancy, low temperature flexibility and adequate tensile strength properties.

Stamper, et al., U.S. Pat. No. 4,515,744, discloses a laminate of fused vinyl chloride polymer plastisols which can be used as a roofing membrane. The outer layer includes titanium dioxide to improve weather resistance, and the inner layer an effective amount of a fire retardant material, e.g., $Sb_2O_3$.

Schoenke, U.S. Pat. No. 4,032,491, claims a roofing membrane formed from a composition which can include, e.g., conventional additives such as fire retardants. Similarly, Tierney, U.S. Pat. No. 4,000,140, discloses a waterproof roofing layer in the form of a sheet comprising a bitumen, a synthetic polymer, and a particulate filler; a fire retardant additive may also be included in the mixture.

Yost, U.S. Pat. No. 4,172,179, discloses a flame retardant plastic laminate which comprises a core section 2 and at least one facing or cladding section 3, although a second such section can be added. The plastic core section 2 can be formed from non-flame retardant polypropylene and a layer of flame retardant plastic material, e.g., polypropylene layer 4, can be attached thereto.

Windecker, U.S. Pat. No. 3,493,460, discloses a fire retardant laminate which comprises a first facing sheet or skin 11 and a fire retardant thermoset resin matrix 12 attached thereto. A core 24 is disposed between faces 21 and 14 of respective elements 17 and 11, which core adheres to the faces via a thermoset resin, e.g., matrix 25 of core 24 comprises a thermoset fire retardant synthetic resin.

Haage, et al., U.S. Pat. No. 3,992,842, discloses, as illustrated in FIG. 1a, a composite sheet having an upper thermoplastic cover layer 1a, a lower thermoplastic cover layer 1b, and an intermediate flameproofing layer 2. The flameproofing layer can be, e.g., inorganic fiber such as fiberglass or asbestos. Two abutting composite sheets of synthetic resin are abutted by solution welding, hot air welding or gluing. The sheet is used for sealing roofs.

SUMMARY OF THE INVENTION

The present invention provides a solution to the noted prior art problems via a composite material in the form of a unitary, singular product that will perform equal to the previously-noted coated product, but will not degrade nor require replenishment to maintain its fire retardancy. Furthermore, this composite material will at least match the performance of the single-ply 100% fire retardant material of a singular formula, at a lower cost.

In accordance with the present invention, a fire retardant composite roofing material comprises an upper layer of a fire retardant EPDM material and a lower layer of a non-fire retardant EPDM material. This composite material, which may take the forms of a cured sheet membrane, a vulcanizable flashing membrane or a non-vulcanizable flashing membrane has a total thickness generally in the range of 0.020 to 0.125 inches and preferably in the range of 0.040 to 0.090 inches, with the thickness of the upper membrane being in the range of up to 75% and preferably up to 50% of the total thickness of the composite material.

Other features and advantages of the present invention will become more readily understood by persons skilled in the art when following the best mode description, currently contemplated by the inventors, in conjunction with the several drawings.

DETAILED DESCRIPTION OF THE DRAWINGS

Figure 1:
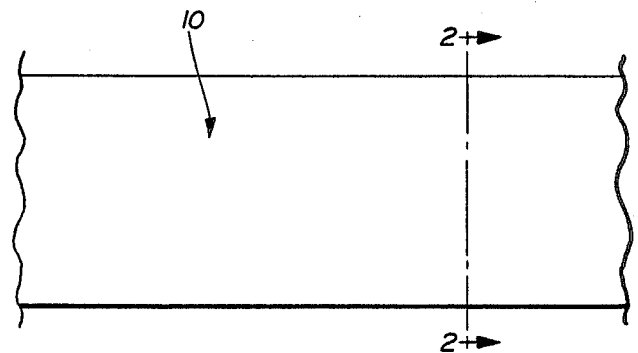
FIG. 1 is a top plan view of a portion of a composite sheet of the fire retardant elastomeric roofing membrane or flashing of the present invention.
Figure 2:
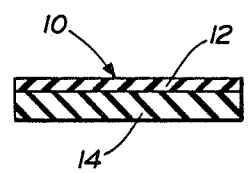
FIG. 2 is a sectional view taken along lines 2—2 in FIG. 1 showing the fire retardant top layer and the standard non-fire retardant bottom layer of the composite sheet membrane or flashing.

Referring now to the drawings, specifically to FIG. 1, there is illustrated a top plan view of a portion of a composite sheet membrane or flashing (hereinafter "composite") 10 made up of a fire retardant top or upper layer 12 and a standard (non-fire retardant) bottom or lower layer 14, as best seen in FIG. 2.

Composite 10, which may be of any desired thickness, generally falls in the range of 0.020 to 0.125 inches and preferably in the range of 0.040 to 0.090 inches, with the thickness of fire-retardant upper layer 12 generally being in the range of up to 75% of the thickness of composite 10 while preferably being in the range of 30 to 50% of the thickness of composite 10, with the thickness of standard lower layer 14 comprising the remainder.

Upper fire retardant layer 12 is so denominated since its top surface is exposed to the atmosphere whereas the bottom surface of lower standard layer 14 is juxtaposed onto and adjoins the roofing substrate (not shown).

Composite or laminate 10 is produced by combining, preferably via laminating, during their manufacture, top layer 12 to bottom layer 14. The normal manufacturing process is to calender one of layers 12 or 14 either in a single continuous sheet of uniform thickness or to calender two equal plies that are then combined into one thickness of the same material. By subsequently calendering resulting layers 12 and 14 into a composite 10, top layer 12, having the fire retardant properties, can be optimized in thickness to provide the desired fire retardant properties at a minimum cost.

Among the more significant advantages of the use of composite 10 are the following:

(1) Elimination of the use of subsequently-applied coatings as a necessary means of enabling standard (non-fire retardant) EPDM materials (such as bottom layer 12) to pass fire testing standard ASTM E108 (UL-790) in some roofing assemblies;

(2) Reduction of the amount (thickness) of fire retardant material (such as top layer 14) necessary to produce a specified thickness of a fire retardant EPDM membrane (such as composite 10);

(3) Improved wind uplift performance for the composite EPDM membrane in comparison with the standard non-fire retardant membrane;

(4) Improved fire classification in comparison with non-fire retardant membranes of equal thickness; and (5) Elimination of the required maintenance of subsequently-applied fire retardant coatings.

DESCRIPTION OF THE PREFERRED EMBODIMENTS

As indicated above, the elastomeric EPDM roof sheeting or flashing composites of the invention comprise a top layer of a fire retardant EPDM composition and a bottom layer of a non-fire retardant EPDM composition. The EPDM compositions used in the top and bottom layers of the composite may generally be of the same composition with the exception that the EPDM composition utilized in the fire retardant top layer will further contain fire retardant additives.

The term "EPDM" as used throughout the specification and claims is used in the sense of its definition as found in ASTM D1418-64 and is intended to mean a terpolymer of ethylene, propylene and a diene monomer. Illustrative methods for preparing such terpolymers are found in U.S. Pat. No. 3,280,082 and British patent No. 1,030,289, the disclosures of which are incorporated herein by reference. The preferred terpolymers contain from about 40 to about 80 weight percent ethylene and from about 1 to about 10 weight percent of the diene with the balance of the terpolymer being propylene.

The diene monomer utilized in forming the EPDM terpolymer is preferably a non-conjugated diene. Illustrative examples of non-conjugated dienes which may be employed are dicyclopentadiene, alkyldicyclopentadiene, 1,4-pentadiene, 1,4-hexadiene, 1,5-hexadiene, 1,4-heptadiene, 2-methyl-1,5-hexadiene, cyclooctadiene, 1,4-octadiene, 1,7-octadiene, 5-ethylidene-2-norbornene, 5-n-propylidene-2-norbornene, 5-(2-methyl-2-butenyl)-2-norbornene and the like. A typical EPDM is Vistalon 2504 (Exxon Chemicals America Co.), a terpolymer having a Mooney Viscosity (ML, 1+8, 100° C.) of about 40 and having 50 weight percent of ethylene, 45 weight percent of propylene and 5.0 weight percent of 5-ethylidene-2-norbornene with an Mn as measured by GPC of about 47,000 and an Mw as measured by GPC of about 174,000. Another typical EPDM is Nordel 1070 an ethylene/propylene/1,4-hexadiene terpolymer having an Mn of about 87,000 and an Mw of about 188,000 available from E.I. du Pont de Nemours & Company.

As indicated, the compositions of the invention also contain vulcanizing agents. It will be evident that the specific vulcanizing agents employed in the compositions are dependent upon the particular elastomer which is utilized in the composition.

Vulcanizing agents which may be employed in EPDM compositions include sulfur and sulfur donor compounds. Mixtures of sulfur and sulfur donor vulcanizing agents may also be utilized and such mixtures are in many instances preferred. Sulfur donor vulcanizing agents which may be employed in the compositions include thiuram polysulfides such as tetramethylthiuram disulfide, tetraethylthiuram disulfide, diisopropylthiuram disulfide, tetrabutylthiuram disulfide, dipentamethylenethiuram tetrasulfide, dipentamethylenethiuram hexasulfide, dicyclohexamethylenethiuram disulfide, phenylethylthiuram disulfide and the like; and salts of dialkyldithiocarbamates such as zinc dibutyldithiocarbamate, zinc dimethyldithiocarbamate, zinc diethyldithiocarbamate, bismuth dimethyldithiocarbamate, nickel dibutyldithiocarbamate, copper dimethyldithiocarbamate, selenium diethyldithiocarbamate, lead dimethyldithiocarbamate, tellurium dimethyldithiocarbamate, tellurium diethyldithiocarbamate, cadmium diethyldithiocarbamate and the like. It should be appreciated that this list is not exclusive and other sulfur donor compounds known in the art may be utilized.

Amounts of sulfur, sulfur donor compounds or mixtures thereof employed in the EPDM elastomer compositions may range from about 0.5 to about 6.0 parts by weight with preferred amounts ranging from 1.0 to 4.0 parts by weight.

In addition to the sulfur or sulfur donor vulcanizing agents, one or more vulcanizing accelerators may be included in the EPDM elastomer compositions. Vulcanizing accelerators which may be employed include thioureas such as ethylene thiourea, N,N'-dibutylthiourea, N,N'-diethylthiourea and the like; thiuram monosulfides such as tetramethylthiuram monosulfide, tetraethylthiuram monosulfide, tetrabutylthiuram monosulfide and the like; benzothiazole sulfenamides such as N-oxydiethylene benzothiazole-2-sulfenamide, N-cyclohexyl benzothiazole-2-sulfenamide, N,N-diisopropyl benzothiazole-2-sulfenamide, N-tert-butyl benzothiazole-2-sulfenamide and the like; 2-mercaptoimidazoline; N,N'-diphenyl-guanidine; N,N'-di-(2-methylphenyl) guanidine; 2-mercaptobenzothiazole, 2-(morpholinodithio)benzothiazole disulfide and zinc 2-mercaptobenzothiazole.

Specific vulcanizing systems which are employed in the EPDM compositions are dependent upon whether the composition is to be used as a roofing membrane or roof flashing composition. In addition, such systems will depend on the desired vulcanization conditions i.e., vulcanization times, temperatures, etc.

As previously indicated, elastomeric roof sheeting or membrane is vulcanized using heat prior to application to the roof surface. Thus, vulcanizing systems for EPDM elastomer compositions used as roofing membranes may be virtually any of those known in the art to be effective in the heat curing of EPDM rubber compositions. Suitable vulcanizing systems for EPDM roofing membranes may readily be determined without undue experimentation by appropriate selection from the vulcanizing agents and accelerators listed above. A typical vulcanizing system for EPDM roofing membrane compositions is illustrated in the examples below and consists of sulfur, tetramethylthiuram disulfide and N-tertiary-butyl benzothiazole-2-sulfenamide.

As previously mentioned, elastomeric roof flashing which is applied to the roof surface in an unvulcanized state contains a special cure package which allows it to cure in-situ on the roof. Thus, EPDM compositions which are used as flashing materials for vulcanized EPDM roofing membranes contain a special vulcanizing system which allows the EPDM flashing to cure in-situ on the roof under ambient temperature conditions over a period of time. In time, the EPDM flashing will develop physical properties which are comparable to those of the vulcanized EPDM roofing membrane.

Vulcanizing systems for the EPDM flashing compositions herein may be readily obtained or developed by those skilled in the polymer vulcanization art without undue experimentation by judicious selection of vulcanizing agents and accelerators from the list of compounds set forth above. In general, such vulcanizing systems will contain sulfur, one or more sulfur donor compounds selected from the group consisting of thiuram polysulfides such as tetramethylthiuram disulfide, dipentamethylenethiuram hexasulfide, dipentamethylene thiuram tetrasulfide, dimethylmorpholino thiuram disulfide and the like; and dithiocarbamate compounds such as zinc diethyldithiocarbamate, tellurium diethyldithiocarbamate and the like; and a vulcanizing accelerator such as tetramethylthiuram monosulfide, 2-mercaptobenzothiazole, 2-(morpholinodithio)-benzothiazole disulfide and the like. Illustrative examples of suitable vulcanizing systems for EPDM roof flashing compositions are described in U.S. Pat. No. 4,461,875, the disclosure of which is incorporated herein by reference. As disclosed in the aforementioned patent, such vulcanizing systems contain sulfur or a sulfur donor curative and dipentamethylenethiuram hexasulfide and optionally one or more vulcanizing accelerators. Vulcanizable EPDM elastomers containing the above vulcanizing systems generally show good cure development in a 70° C. oven indicating their suitability for roof curing.

Amounts of vulcanizing agents employed in the vulcanizable elastomeric roof sheeting and flashing compositions of the invention may range from about 0.5 to about 6.0 parts by weight with preferred amounts ranging from 1.0 to 4.0 parts by weight.

It should be noted that non-vulcanizing fire retardant EPDM roof sheeting and flashing materials may also be employed in the composites of this invention. Such composites may be readily produced by deleting the vulcanizing agents from the compositions of both the fire retardant and non-fire retardant materials.

As indicated, the fire retardant EPDM composition used as the top layer of the roofing composites of the invention further contains fire retardant additives. In general, any of the fire retardant additives known in the art to be useful in imparting fire retardant properties to EPDM elastomers may be employed in the composition. Thus, fire retardant additives which may be utilized include among other halogenated aromatic compounds such as the bis-(acryloxyethyl)ether of tetrabromobisphenol-A, decabromodiphenyl oxide and the like; brominated compounds such as brominated ethers, brominated imides and the like; chlorinated polyethylene, hydrated metal oxides such as aluminum trihydrate; and antimony troxide and zinc borate. However, the preferred fire retardant additives are combinations of decabromodiphenyl oxide (DBDPO) with antimony trioxide or zinc borate or mixtures of antimony trioxide and zinc borate. The ratios of DBDPO: antimony trioxide or zinc borate or mixtures thereof employed in the fire retardant additive combinations may range from 1:1 to 4:1 with the preferred ratio being 3:1. Amounts of fire retardant additives employed in the EPDM composition may range from about 30 to about 70, preferably 40 to 60, parts by weight per 100 parts by weight of EPDM elastomer.

The compositions of the invention may also contain other conventional rubber compounding and vulcanizing ingredients. Thus, the compositions may contain processing or softening oils which may be added as such or may be present from oil-extended rubbers, zinc oxide, stearic acid, sulfur, antioxidants, UV stabilizers, accelerators, cure retarders, processing aids, tackifying resins and the like. Fillers such as carbon black, silicates, talc, mica, calcium carbonate and the like may be used; typically conventional carbon black is employed.

The vulcanizable elastomeric composition used in the manufacture of roof sheeting or flashing may be prepared by mixing the ingredients of the composition in an internal mixer, for example, a Banbury mixer, an extruder and/or a two-roll mill. In the type B Banbury internal mixer, the dry or powdery materials are added rapidly followed by the addition of any liquids, e.g., process oils, plasticizers etc., and finally the elastomers. This type of mixing is often referred to as an upside-down mixing technique.

The roofing compositions may be prepared in sheet form in known manner by calendering or extrusion and then cutting the sheet to desired dimensions. The sheets may be cut for use as roof sheeting or flashing. Roof sheeting membrane and roof flashing are manufactured from rubber compounds and are typically evaluated for physical properties using test methods developed for mechanical rubber goods. Typical properties include tensile strength, modulus, ultimate elongation, tear resistance, ozone resistance, water absorption and hardness.

The following example is submitted for the purpose of further illustrating the nature of the present invention and are not to be considered as a limitation on the scope thereof but are exemplary only. Parts and percentages shown in the example are by weight, unless otherwise indicated and may be utilized within the amounts shown below as they would be compounded by one skilled in the art.

EXAMPLE

In this example, a roofing composite of the invention was prepared using a standard EPDM composition and a fire retardant (F.R.) EPDM composition. The compositions had the following formulations:

| Ingredients | Standard EPDM | F.R. EPDM |
|---|---|---|
| EPDM | 100 | 100 |
| Carbon Black | 80 to 160 | 80 to 160 |
| Process Oil | 50 to 120 | 50 to 120 |
| Mineral Fillers (Talc,Clay,Etc.) | 0 to 50 | 20 to 80 |
| DBDPO | — | 25 to 50 |
| Antimony Trioxide | — | 8 to 20 |
| Zinc Borate | — | 0 to 20 |
| Zinc Oxide | 2 to 10 | 2 to 10 |
| Stearic Acid | 0.5 to 1.5 | 0.5 to 1.5 |
| Sulfur | 0.5 to 1.5 | 0.5 to 1.5 |
| Tetramethylthiuram Disulfide | 0.3 to 0.8 | 0.3 to 0.8 |
| Tetraethylthiuram Disulfide | 0.3 to 0.8 | 0.3 to 0.8 |
| N—t-butyl-2-benzothiazyl Sulfenamide | 1.5 to 3.0 | 1.5 to 3.0 |

The above formulations were mixed using the procedure previously described in the specification.

The composite was prepared in accordance with the following general procedure. First, the standard EPDM composition was calendered to a thickness of 0.040 inches. Then, the F.R. EPDM composition was calendered to a thickness of 0.020 inches. The calendered sheets of standard EPDM and F.R. EPDM were then laminated together while still hot using pressure calender rolls with the F.R. EPDM sheet being laminated to the standard EPDM sheet to produce the composite sheet. The resultant composite sheet was then cured in a conventional manner in steam in an autoclave.

Samples of the resultant roof sheeting composite, with the F.R. EPDM exposed to atmosphere and the standard non-fire retardant EPDM adjacent to the roofing insulation, were subsequently evaluated by Underwriters Laboratories Inc. using the procedures set forth in the publication: "Standard For Tests For Fire Resistance of Roof Covering Materials, UL790 Fifth Edition" published Oct. 5, 1983. The roof sheeting composite met one or more of the classifications in UL790.

As previously noted, a single ply 100% fire retardant material of a singular formula, such as that set forth in the given example, produced by calendering together two 0.030 inch layers produces a 0.060 inch thick material, that while being fully acceptable from the fire-retardant property standpoint, suffers from the disadvantages of cost, decreased physical properties and decreased interply adhesion in comparison to the noted non-fire retardant material set forth in the example. In an attempt to decrease the cost, a 50% reduction of the fire-retardant additives produced a material that was not acceptable from the fire-retardant property standpoint. However surprisingly and unexpectedly so, a 0.060 inch thick composite material made by calendering together a 0.030 inch layer of the noted F.R. retardant material and a 0.030 inch layer of the noted non F.R. retardant material resulted in a material having fire-retardant properties substantially similar to that of the noted 0.060 inch fire-retardant material in most applications while unexpectedly also having improved physical properties as well as improved interply adhesion properties in comparison to the noted 0.060 inch fire retardant material and at a lower cost as well.

Accordingly, the fire retardant elastomeric EPDM roofing sheeting and flashing combinations of this invention provide effective, safe, inexpensive and efficient materials which eliminate difficulties encountered in the prior art, solve problems and obtain new and unexpected results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. An EPDM composite roofing material, with a top surface exposed to the atmosphere and a bottom surface adjoining a roofing substrate, said material being of a predetermined thickness and having a fire retardant additive incorporated substantially only in that portion of said material extending from said top surface inwardly toward said bottom surface, wherein the thickness of that portion of said material incorporating said fire retardant additive ranges up to 75% to the total predetermined thickness of said material.

2. The roofing material of claim 1 wherein the predetermined thickness of said material is in the range of 0.020 to 0.125 inches, with the thickness of that portion of said material incorporating said fire retardant additive ranging up to about 50% of said predetermined thickness range.

3. The roofing material of claim 1 wherein said material is a cured sheet membrane.

4. The roofing material of claim 1 wherein said material is a vulcanizable flashing material.

5. The roofing material of claim 1 wherein said material is a non-vulcanizing flashing material.

* * * * *